United States Patent [19]

Suzuki et al.

[11] Patent Number: 4,926,334

[45] Date of Patent: May 15, 1990

[54] SYSTEM AND METHOD FOR AUTOMATICALLY CONTROLLING A VEHICLE SPEED TO A DESIRED CRUISING SPEED

[75] Inventors: Kouichi Suzuki, Tokyo; Kiyoshi Konishi, Kanagawa, both of Japan

[73] Assignee: Nissan Motor Company, Limited, Yokohama, Japan

[21] Appl. No.: 43,532

[22] Filed: Apr. 28, 1987

[30] Foreign Application Priority Data

May 1, 1986 [JP] Japan .................. 61-102442

[51] Int. Cl.$^5$ ............................................ B60K 31/00
[52] U.S. Cl. .............................. 364/426.04; 180/179; 123/352
[58] Field of Search ............ 364/426.04, 431.07; 180/170, 176, 179; 123/352

[56] References Cited

U.S. PATENT DOCUMENTS

| | | | |
|---|---|---|---|
| 4,591,986 | 5/1986 | Nakajima et al. | 364/426 |
| 4,598,370 | 7/1986 | Nakajima et al. | 364/426 |
| 4,723,213 | 2/1988 | Kawata et al. | 364/426 |
| 4,725,969 | 2/1988 | Onogi et al. | 180/179 |

FOREIGN PATENT DOCUMENTS 59-8023 1/1984 Japan .

Primary Examiner—Gary Chin
Attorney, Agent, or Firm—Foley & Lardner, Schwartz, Jeffery, Schwaab, Mack, Blumenthal & Evans

[57] ABSTRACT

A system and method for automatically controlling a vehicle speed to a desired cruising speed in which, when a given operation of the set switch (turn off after turn on of the set switch) is carried out, control constants used in a control equation expressed as $(K \times a + \epsilon) \times G$ in accordance with which the vehicle speed is controlled so as to coincide with a stored vehicle speed, are changed from those used when the vehicle is cruisingly run at the stored vehicle speed. The stored vehicle speed is the vehicle speed stored when the given operation of the set switch is carried out. Therefore, the vehicle speed speedily converges the stored vehicle speed with an overshoot of the vehicle speed at such a transient state suppressed to a minimum regardless of vehicle models, environmental factors, and adjustment state of a control wire connected between an actuator and throttle valve.

14 Claims, 9 Drawing Sheets

SYSTEM AND METHOD FOR AUTOMATICALLY CONTROLLING A VEHICLE SPEED TO A DESIRED CRUISING SPEED

BACKGROUND OF THE INVENTION

The present invention relates to a system and method for automatically controlling a running speed of a moving object such as a vehicle to a desired cruising speed. The present invention is particularly but not exclusively applicable to the system and method for automatically controlling the vehicle speed in which the vehicle speed is automatically controlled so as to coincide with a set cruising speed at which the vehicle driver desires to run.

Such automatic vehicle speed controlling systems are exemplified by a Japanese Patent Application First Publication (Tokkai) Sho 59-8023 published on Jan. 17, 1984.

In the above-identified Japanese Patent Application document, the automatic vehicle speed controlling system includes a vehicle speed sensor which senses an actual vehicle speed and outputs an operational data in proportion to the actual vehicle speed, a command switch group having a set switch for operatively outputting a cruise command signal, a memory for storing the operational data on the vehicle speed derived from the vehicle speed sensor in response to the cruise command signal of the set switch, an actuator responsive to a command signal for driving a throttle valve of a vehicular engine so that an angular position of the throttle valve is displaced, and a control unit for issuing the command to the actuator to drive the throttle valve according to a difference between the actual vehicle speed and stored set vehicle speed in the memory.

In the above-described automatic vehicle speed controlling system, when the set switch is operated to turn off after a turn-on operation of the set switch, the vehicle speed at the time of the set switch turn-off operation is stored in the memory. The control unit issues the command to the actuator according to the difference between the actual vehicle speed and stored vehicle speed. The angular displacement of the throttle valve by means of the actuator causes the vehicle speed to coincide with the stored vehicle speed. Thus, the vehicle is constantly run at the stored vehicle speed. Such automatic vehicle speed controlling systems are convenient for the vehicle to run on freeways.

Since engine output characteristics, gear reduction ratios and weights, etc., are individually different as are models of vehicles on which the above-described automatic vehicle speed controlling systems are mounted, control constants such as those used in initializations of vehicle speed control programs, a constant K, gain G (control equation of $(K \times e\alpha + \epsilon) \times G$}, and those used at the time of a release operation of an accelerator pedal are varied so as to cope with the variations such as the vehicle model output characteristics.

However, since the constant K and gain G affect a control performance of the automatic vehicle speed controlling systems, the control over the vehicle speed is carried out with the same control constants (K and gain G) in the control equation as those immediately after the above-described given operation of the set switch in a transient state and as those during the cruising speed controlling a steady state. Therefore, although appropriate control constants (K and gain G) for each of the vehicles are set, overshooting or undershooting of the vehicle speed occurs for a long duration of time immediately after the off operation of the set switch and such unstable states cannot be settled depending on a road condition (e.g., ascending slope or descending slope) on which the vehicle runs.

In addition, in a case where an adjustment of a control wire connected between the actuator and throttle valve such as for tension or length, etc., is inappropriate even though a strictly set initialize value corresponding to the vehicle speed at the time of the off operation of the set switch is applied to the actuator, the overshooting or undershooting problem inevitably occurs at the transient state immediately after the off operation of the set switch.

SUMMARY OF THE INVENTION

It is an object of the present invention to provide a system and method for automatically controlling a running speed of a moving object to a desired cruising speed which can suppress an overshoot of the running speed to a minimum in a transient state immediately after a switching of the running speed to a set cruising speed.

It is another object of the present invention to provide the automatic vehicle speed controlling system and method for a vehicle which can speedily converge an overshooting or undershooting of the vehicle speed immediately after operation of the set switch.

It is still another object of the present invention to provide the automatic vehicle speed controlling system and method which can cancel environmental factors such as road conditions (the vehicle runs on ascending or descending slopes) and/or mechanical factors such as inappropriate adjustment of the control wire connected between the actuator and throttle valve.

The above-described objects can be achieved by providing a system for automatically controlling a running speed of a moving object to a desired cruising speed, comprising: (a) first means for detecting the running speed of the moving object; (b) second means for operatively generating and outputting a command signal to run the moving object at a cruising speed, the cruising speed being a running speed at the time of the output of the command signal by the second means; (c) third means for storing the running speed detected by the first means as the cruising speed in response to the output of the command signal by the second means; (d) fourth means responsive to the command signal for suppressing an overshoot of the running speed to a minimum which occurs immediately after the second means generates and outputs the command signal; and (e) fifth means for controlling the running speed so that the running speed coincides with the stored vehicle speed after the fourth means suppresses the overshoot.

The above-described objects can also be achieved by providing a system for automatically controlling vehicle speed to a desired cruising speed, comprising: (a) first means for detecting the vehicle speed! (b) second means for operatively generating and outputting a command signal to run the vehicle at the present speed at which the vehicle cruises; (c) third means for storing the vehicle speed at which the vehicle cruises in response to the command signal output by the second means! (d) fourth means responsive to the command signal for controlling the vehicle speed in accordance with a control equation having first control constants immediately after the second means generates and outputs the command signal, and (e) fifth means for controlling the vehicle speed in accordance with the control equation having second control constants so that the vehicle speed coincides with the stored vehicle speed after the fourth means controls the vehicle speed.

The above described objects can also be achieved by providing a method for automatically controlling a vehicle speed to a desired cruising speed, comprising the steps of: (a) detecting the vehicle speed: (b) generating and outputting a command signal to run the vehicle speed at a speed when a given operation of a set switch is carried out; (c) storing the vehicle speed at which the vehicle cruises in response to the command signal outputted in the step (b); (d) suppressing an overshoot of the vehicle speed to a minimum, the overshoot occurring immediately after the vehicle speed is controlled to arrive at the stored vehicle in step (c) in accordance with a predetermined control equation having first control constants in response to the command signal outputted in step (b); and (e) controlling the vehicle speed detected in step (a) in accordance with the predetermined control equation having second control constants so that the vehicle speed coincides with the stored vehicle speed after the suppression of the overshoot in step (d).

DETAILED DESCRIPTION OF THE PREFERRED EMBODIMENTS

Reference will hereinafter be made to the drawings in order to facilitate understanding of the present invention.

First Preferred Embodiment

Figure 1:
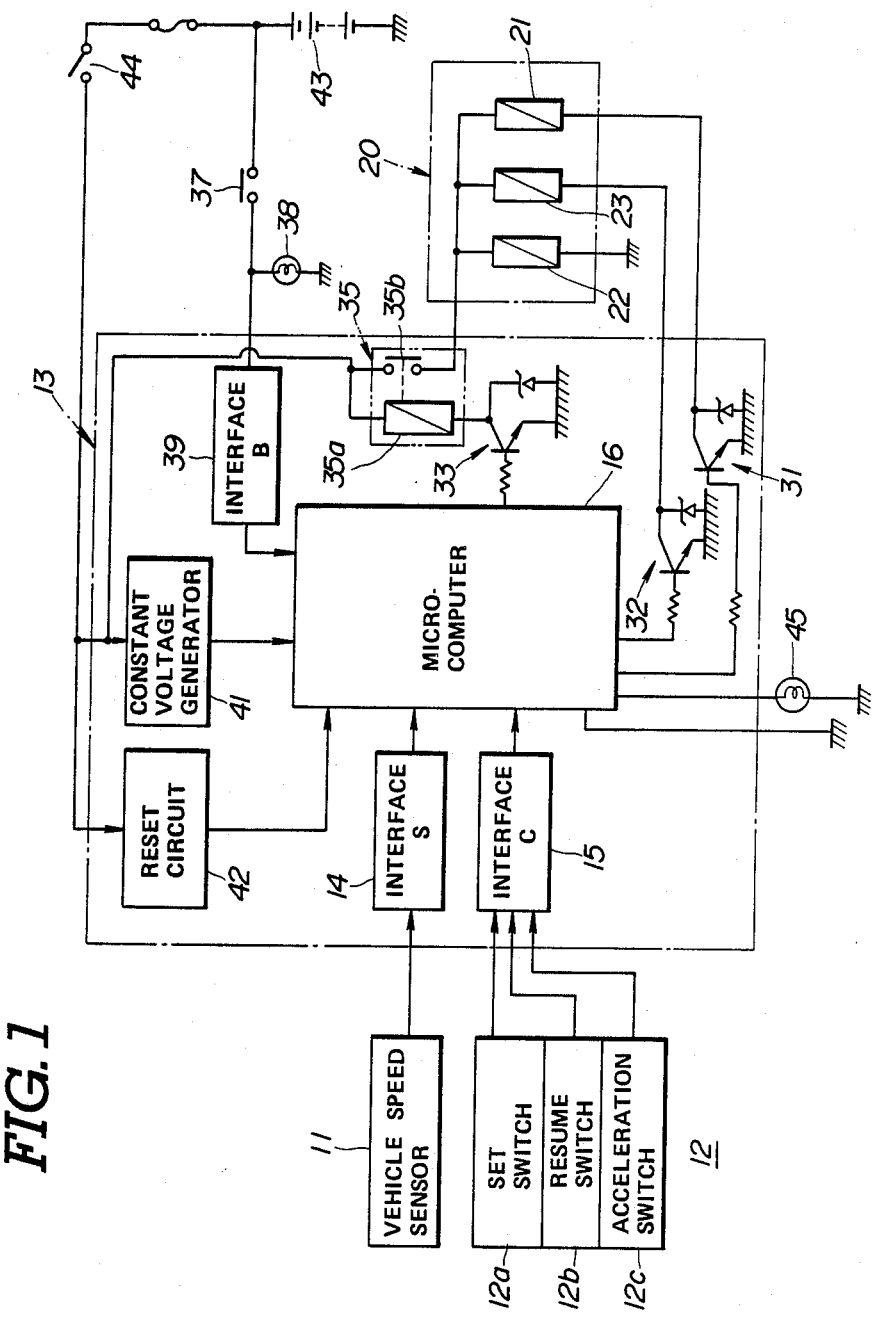
FIG. 1 is a circuit block diagram of a first preferred embodiment of an automatic vehicle controlling system according to the present invention.

FIG. 1 shows a circuit construction of an automatic vehicle speed controlling system in a first preferred embodiment according to the present invention.

As shown in FIG. 1, a vehicle speed sensor 11 is installed in the vehicle for detecting an actual vehicle speed and outputting operational data in proportion to the actual vehicle speed. A command switch group 12 is installed in the vehicle for outputting predetermined command signals in accordance with their given operations for the command switch group 12 by an operator. The command switch group 12 includes a set switch 12a, a resume switch 12b, and an acceleration switch 12c. The function of the set switch 12a will be described later.

The output signals of the vehicle speed sensor 11 and command switch group 12 are transmitted to a microcomputer 16 via an interface 14 and interface 15 provided within a controller 13. The microcomputer 16 constitutes a control unit of the whole controller 13. The microcomputer 16 includes a CPU (Central Processing Unit), ROM (Read Only Memory), RAM (Random Access Memory), and an I/O unit.

The microcomputer 16 in the first preferred embodiment functionally comprises vehicle speed storing means for storing the operational data (pulse signal) of the vehicle speed sensor representing the vehicle speed (actual vehicle speed), upon receipt of the command signal issued at the time of a given operation of the set switch 12a of the command switch group 12, setting means for setting a first control constant which is different from a second control constant applied during the cruise control of the vehicle speed in which there is no switching operation of the set switch 12a, the first control constant being set immediately after the given operation, i.e., the off operation of the set switch 12a subsequent to the turn-on operation thereof, and controlling means for controlling the vehicle speed so as to maintain the vehicle speed constant at the stored vehicle speed, according to a difference between the actual vehicle speed and stored vehicle speed, in accordance with a control equation whose control constants are set by the setting means.

In the case of the first preferred embodiment, the setting means sets two control constants $K_i$ and $G_i$ which are different in value from the K and G used in the cruising speed control, until a predetermined time has elapsed immediately after a switching off operation (the above-described given operation) of the set switch 12a.

Figure 2:
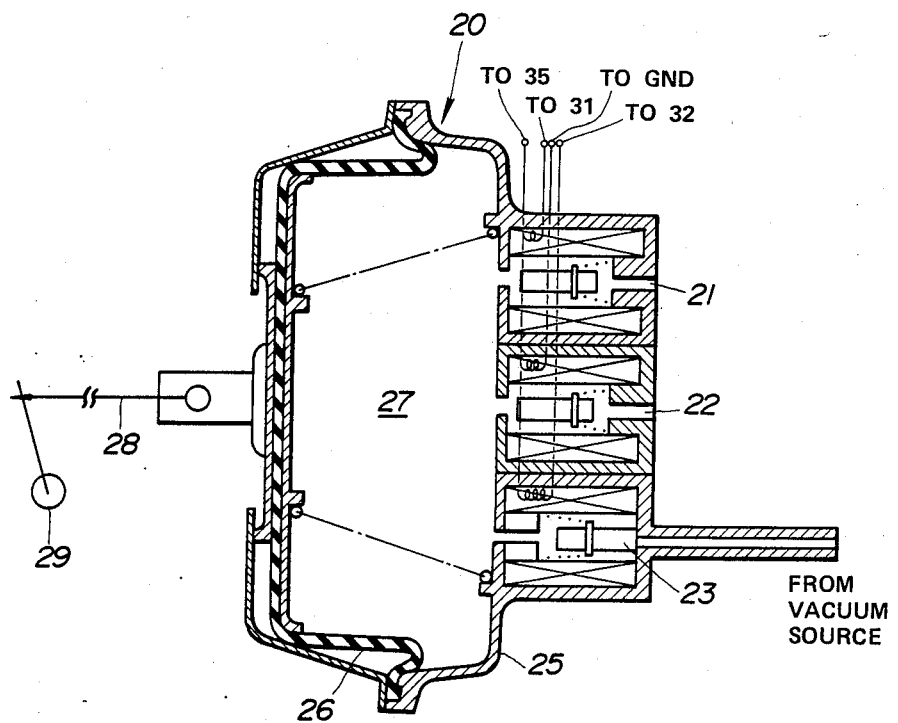
FIG. 2 is a cross sectional view of an actuator shown in FIG. 1.

In FIG. 1, an actuator 20 is connected to the controller 13, i.e., a relay circuit 35 installed in the controller 13. The detailed construction of the actuator 20 is shown in FIG. 2.

The actuator 20 includes a vent valve 21, a safety valve 22, and a vacuum valve 23. One end of the vent valve 21 and safety valve 22 is exposed to atmospheric pressure. One end of the vacuum valve 23 is linked with a vacuum source such as an intake manifold of the vehicular engine. The other ends of each valve 21, 22, and 23 are communicated to a negative pressure chamber 27 defined by a casing 25 and a side surface of a diaphragm 26 (right surface as viewed from FIG. 2). The other surface side of the diaphragm 26 (left surface as viewed from FIG. 2) is connected to one end of a control wire 28. The other end of the control wire 28 is connected with an axle of a throttle valve 29 in parallel with another linkage connected to an accelerator pedal (not shown). The throttle valve 29 controls intake air flow rate of the vehicular engine according to its angular displacement.

Furthermore, the controller 13 includes a vent valve switching section 31 for controlling an on-and-off operation of the vent valve 21 in response to an open and close command signal derived from the microcomputer 16, a vacuum valve switching section 32 for controlling an on-and-off operation of the vacuum valve 23 in response to an open and close command signal derived from the microcomputer 16, and an actuator switching section 33 for controlling an on-and-off operation of a power supply to the actuator 20. The on and off switchings of the power supply for the actuator 20 are carried out by means of the relay circuit 35. The relay circuit 35 includes a relay coil 35a and relay switch 35b. The safety valve 23 is connected between the actuator relay circuit 35 and ground.

In addition, numeral 37 denotes a brake switch and numeral 38 denotes a brake lamp. A signal for cancelling the automatic vehicle speed controlling system is outputted from the brake switch 37 to the Controller 13, i.e., to the microcomputer 16 via an interface B 39 within the controller 13.

Furthermore, numeral 41 denotes a constant voltage supply circuit, numeral 42 denotes a reset circuit, numeral 43 denotes a power supply such as a vehicle battery, numeral 44 denotes a main switch disposed between the battery 43 and the controller 13, and numeral 45 denotes a cruising lamp.

Figure 3A:
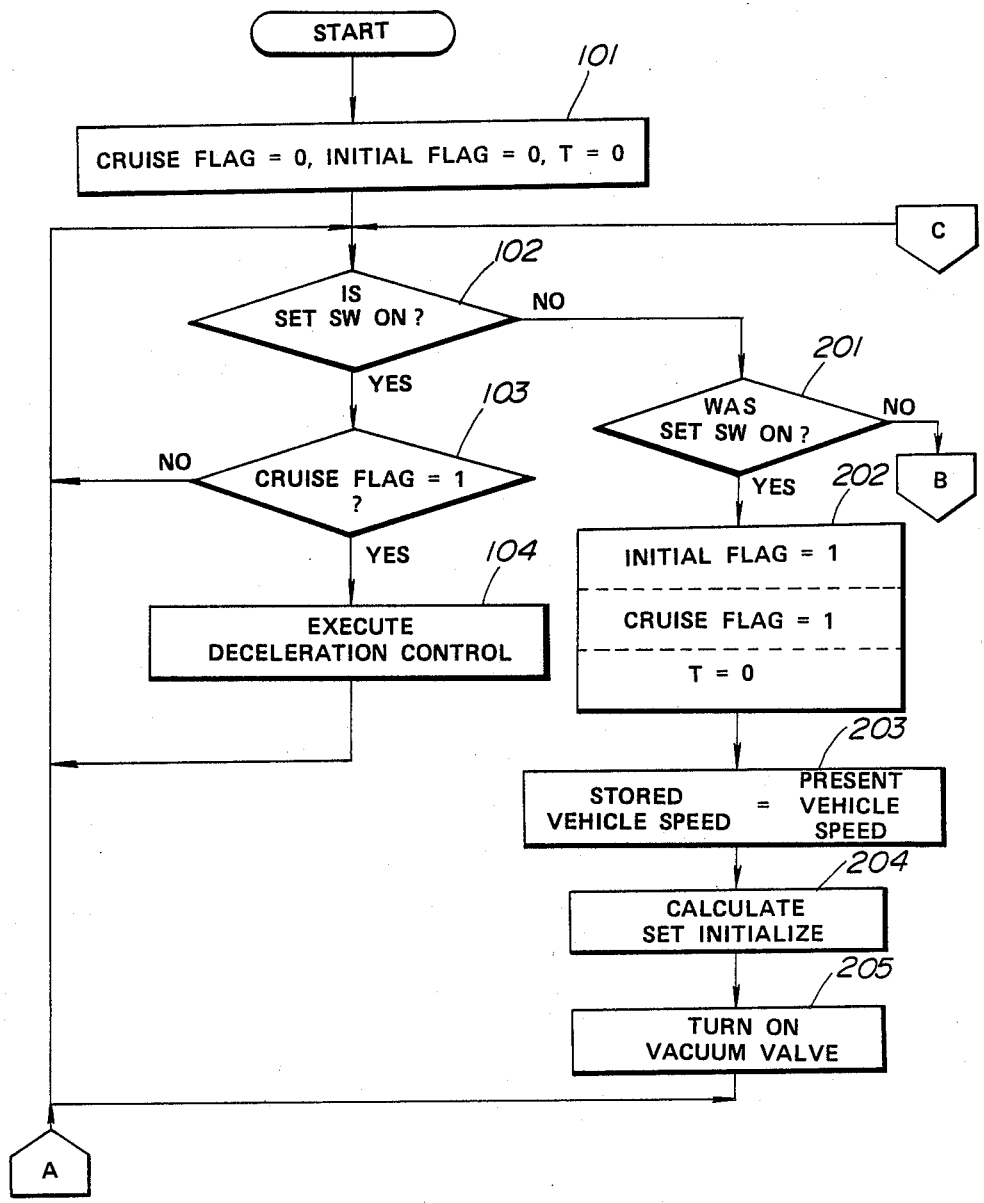
FIGS. 3(A) and 3(B) are integrally a flowchart indicating a control program routine executed by means of a microcomputer shown in FIG. 1.

Next an operation of the automatic vehicle speed controlling system in the first preferred embodiment will be described with reference to FIGS. 3(A). 3(B), and 4.

Figure 3B:
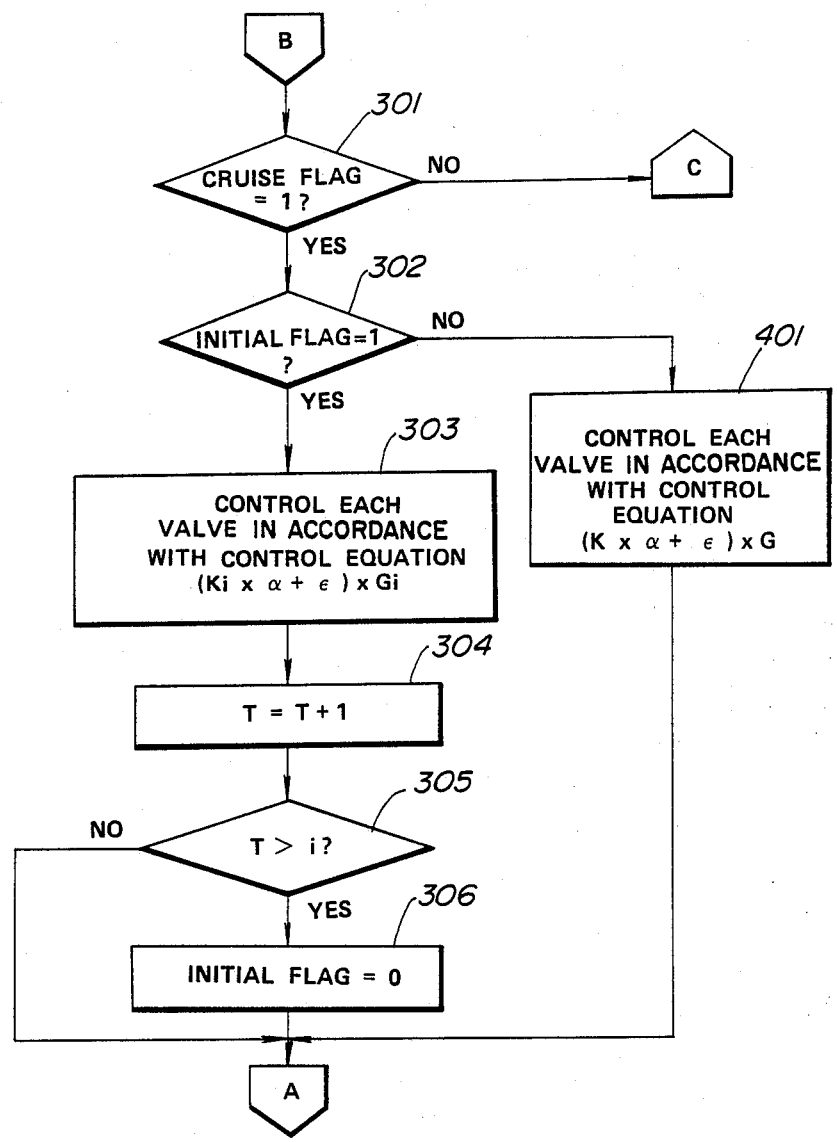

It is noted that the main switch 44 is first turned on to supply the power of the controller 13 from the power supply 43. At this time, the vehicle speed sensor 11 outputs a pulse signal which is operational data in proportional to the actual vehicle speed. The microcomputer 16 receives the pulse signal, samples it within a constant period of time, and always recognizes the number of pulses proportional to the vehicle speed. In this state, a control routine shown in FIGS. 3(A) and 3(B) is also executed by means of the microcomputer 16.

That is to say, in a step 101, an initialization is carried out, i.e., a cruise flag is 0 reset to zero, an initial flag is reset to zero, and timer T is reset to zero. In a step 102, the microcomputer 16 determines whether the set switch 12a is turned to on. If the set switch 12a is turned to on (YES), the routine goes tO a Step 103. In the step 103, the microcomputer 16 determines whether the cruise flag is now set to 1. That is to say, the microcomputer 16 determines whether the vehicle speed is under a cruising control when the set switch 12a is turned on. If the cruise flag is now not set to 1, the routine returns to the Step 102. If the cruise flag is set to 1, the routine goes to a step 104. In the step 104, the microcomputer 16 carries out a predetermined deceleration operation control in response to the turn-on operation of the set switch 12a.

It is noted that the cruise flag indicates whether the vehicle speed is under a cruise speed control and the initial flag indicates whether the set switch 12a is in a state immediately after the off operation thereof.

In the step 102, the routine goes to a step 201 if the set switch 12a is not turned to on (NO). In the step 201, the microcomputer 16 determines whether the set switch is turned off after it is once turned on. If the microcomputer 16 determines that the off state of the set switch 12a is after the on state of the set switch 12a (YES), the routine goes to a step 202 in which the initial flag is set to 1, the cruise flag is set to 1 and the timer T is reset. In the next step 203, the present vehicle speed is stored as a stored vehicle speed. The present vehicle speed is the vehicle speed at which the set switch 12a is switched from the on state to the off state. In a step 204, a set initialize is calculated on the basis of the stored vehicle speed in the step 203. Then, in a step 205, the vacuum valve 23 is set to on to introduce the negative pressure into the chamber 27 so that the throttle valve 29 is prepared for the angular displacement according to the pressure in the chamber 27, which will be described later, in accordance with the set initialize calculated in the step 204. Then the routine is returned to the step 102. In other words, the vehicle speed at the time of the off operation of the set switch 12a is stored as the stored vehicle speed when the set switch 12a is turned off after the set switch 12a has once been turned on. The vehicle speed cruise control is, then, started on the basis of the stored vehicle speed.

Figure 4:
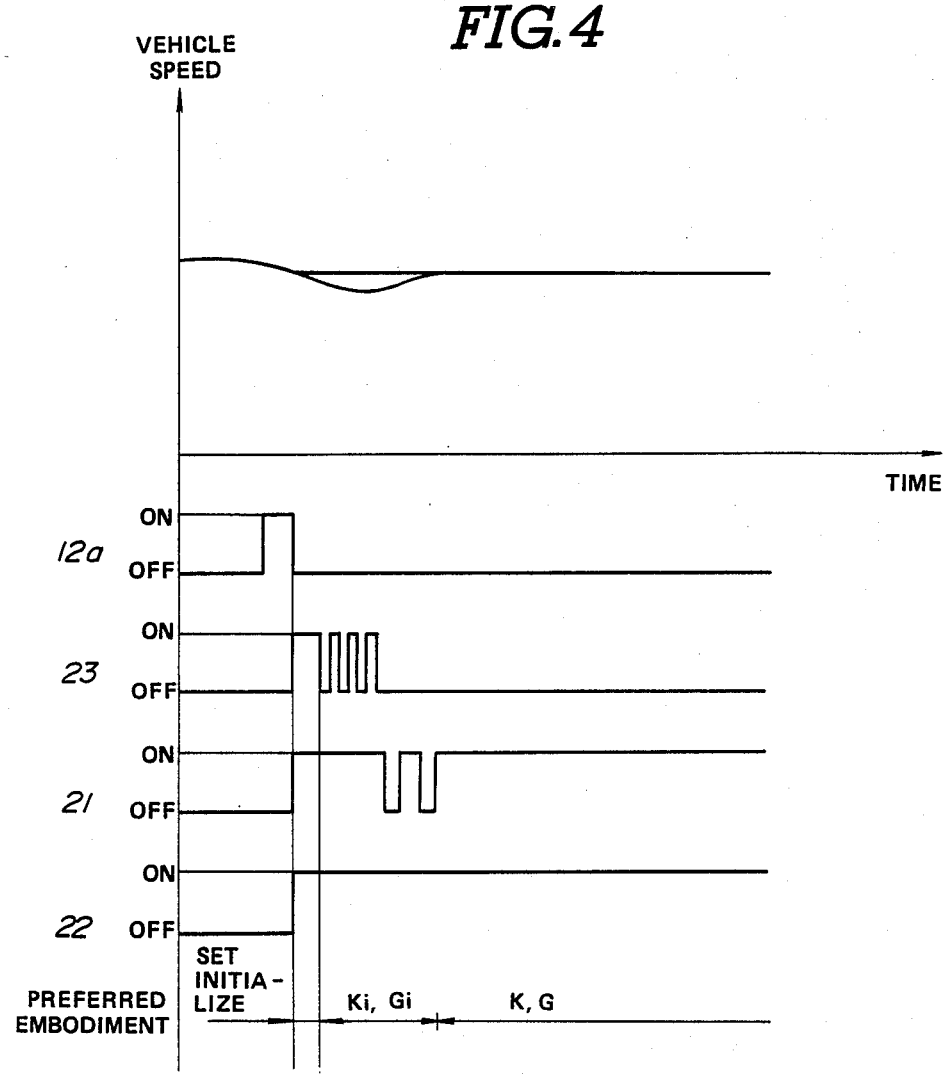
FIG. 4 is a timing chart indicating an operation state of the automatic vehicle speed controlling system.

On the other hand, the routine goes to a step 301 when the set switch 12a is not on (NO) in the step 201. In the step 301, the microcomputer 16 determines whether the cruise flag is set to 1. If the cruise flag is not set to 1, the routine returns to the step 102. If the cruise flag is set to 1 (YES). the routine goes to a step 302. In the step 302, the microcomputer 16 determines whether the initial flag is set to 1. That is to say, the microcomputer 16 determines whether the set switch 12 has just been operated to turn off. If the initial flag is set to 1 in the step 302 (YES). the routine goes to a step 303. In the step 303, first control constants Ki and Gi, immediately after the set switch has been operated to turn off, are used in the control equation to control each valve 21, 22, and 23 of the actuator 20 as shown in FIG. 4. That is to say, according to a difference of the vehicle speed between the stored vehicle speed and actual vehicle speed, the control equation $(Ki \times \alpha + \epsilon) \times G$ is used to carry out transient state controls over the respective valves 21, 22, and 23. In the control equation, $\alpha$ denotes a change rate of the vehicle speed, $\epsilon$ denotes a difference between the vehicle speed and stored vehicle speed, and Gi denotes a control gain and one of the first control constants.

In a step 304, a value of the timer T is incremented by one in such a way as $T = T + 1$.

In a step 305, the microcomputer 16 determines whether the timer T indicates a lapse of a predetermined time i. If the value of the timer T does not indicate the lapse of the predetermined time i (NO), the routine returns to the step 102. If the value of the timer T indicates the lapse of the predetermined time i (YES), the routine goes to a step 306. In the step 306, the initial flag is reset to zero. Thereafter, the routine returns to the step 102.

In addition, if the microcomputer 16 determines that the initial flag is not set to 1 in the step 302 (NO), the rOutine goes to a step 401. In the step 401, each valve 21, 23, and 23 of the actuator 20 is controlled using the control equation $(K \times \alpha + \epsilon) \times G$ so that the throttle valve 29 angularly displaces. In this way, while the main switch 44 is closed, the controller 13 is operated in a loop state in accordance with the control program routine shown in FIGS. 3(A) and (B).

Next, an operation of the automatic vehicle speed controlling system will be described below on the basis of various set operations.

At first, a set operation in which the vehicle speed is transferred t the cruising running state in response to the turn-off operation of the set switch 12a will be described below.

After a set command signal is inputted to the microcomputer 16 with the set switch 12a in the ON state (ON operation), the set command signal is released when the set switch 12a is, in turn, turned off.

In other words, the microcomputer 16 determines that the set switch 12a has been turned on in the step 102 (YES). Then, the microcomputer 16 determines that the set switch 12a is, in turn, turned off in the step 102 (NO). Then, the microcomputer 16 determines that the off state of the set switch 12a is a changed state from the on state to the off state in the step 201 (YES). In the step 202, the initial flag and cruise flag are set to 1s and the timer T is reset. Then, in the step 203, the microcomputer 16 stores the vehicle speed (i.e., the present vehicle speed) at the time of off operation of the set switch 12a as the stored vehicle speed. In the step 204, the set initialize for the actuator 20 is calculated which corresponds to the stored vehicle speed. Then, the vacuum valve 23 of the actuator 20 is set to the on state in accordance with the calculated set initialize.

In detail, the cruise lamp 5 is lighted and the microcomputer 16 turns the vent valve 21 and safety valve 22 to the on state to close inlets of both valves 21 and 22 so as to interrupt the negative pressure chamber 27 from being exposed to atmospheric pressure. On the other hand, the vacuum valve 23 is opened to introduce negative pressure into the negative pressure chamber 27 with the vacuum valve 23 turned on in accordance with the set initialize. The axle of the throttle valve 29 is consequently maintained at an angular position corresponding to the present vehicle speed via the control wire 28.

Thereafter, the microcomputer 16 determines that the cruise flag is set to 1 (YES) in the step 301. The microcomputer 16 determines that the initial flag is set to 1 in the Step 302 (YES). The microcomputer 16 determines that the first control constants Ki and Gi are used to control each valve 21, 22, and 23. That is to say, a drive command on the basis of the control equation $(Ki \times \alpha + \epsilon) \times Gi$ is issued from the microcomputer 16 to the actuator 20 so that the number of pulses proportional to the actual vehicle speed detected equals to the number of pulses stored in the way described above. The negative pressure state within the negative pressure chamber 27 of the actuator 20 is controlled by carrying out the on-and-off controls of both vent valve 21 and vacuum valve 23 via the vent valve switching section 31 and vacuum valve switching section 2. For example, when the actual vehicle speed is smaller than the stored vehicle speed by a predetermined value, the vacuum valve switching section 2 is operated to open the vacuum valve 23 by means of the microcomputer 16.

At this time, the vacuum valve 23 introduces the negative pressure into the negative pressure chamber 27 with the vacuum valve 23 turned to the on state. Consequently, the throttle valve axle 29 is pivoted slightly in the open direction of the valve axle 29 so that the vehicle speed is increased. On the other hand, when the actual vehicle speed is larger than the vehicle speed by the predetermined value, the vent valve switching section is operated by means of the microcomputer 16. Therefore, the vent valve 21 is turned off to introduce the atmospheric pressure into the negative pressure chamber 27 so that the throttle valve axis 29 is pivoted slightly in the close direction of the valve to decrease the vehicle speed. In this way, such operations are repeated to maintain the vehicle speed constant at the stored vehicle speed.

In the step 304, the timer T is incremented by one in the equation such as $T = T + 1$. When the microcomputer 16 determines that the predetermined time i has elapsed (YES) in the step 304, the initial flag is reset in the step 306.

Thereafter, the microcomputer 16 determines that the initial flag is not set to 1 in the step 302 (NO). In the step 401, the microcomputer 16 changes from the control constants Ki and Gi used immediately after the off operation of the set switch 12a to constants K and G during the steady state cruise running control. In other words, the vehicle speed is then controlled in accordance with the control equation $(K \times \alpha + \epsilon) \times G$ to maintain the vehicle speed constant at the stored cruising speed as described above.

Next, after the deceleration control corresponding to the on operation of the set switch 12a during the cruise operation, the deceleration operation in which the vehicle speed is reduced in response to the on operation of the set switch 12a during the cruise control will be described below.

The vehicle speed is reduced by means of the deceleration control through an engine braking. The vehicle speed is transferred in the cruise running state at the speed corresponding to the off operation of the set switch 12a. In the step 102, the microcomputer 16 determines that the set switch 12a is turned to the on state (YES). In the step 103, the microcomputer 16 determines that the cruise flag is turned to 1 (YES) and carries out the deceleration control in the step 104.

When the set switch 12a is set to the off state, the microcomputer 16 determines that the off state of the set switch 12a is changed from the on state in the step 201 (YES), the initial flag and cruise flag are set to 1s, respectively, in the steps 202 to 205 in the same way as described above and the timer T is reset. The vehicle speed (present vehicle speed) at the time of the off operation of the set switch 12a is stored as the stored vehicle speed, the set initialize corresponding to the stored vehicle speed is calculated, and the vacuum valve 23 is set to the on state in accordance with the set initialize.

The microcomputer 16 determines that the initial flag is set to 1 in the step 302 (YES). The microcomputer 16 determines that each valve 21, 22, and 23 is controlled in accordance with the control constants Ki and Gi at the transient state immediately after the off operation of the set switch 12a. That is to say, the controller 13 controls the vehicle speed to maintain the vehicle speed constant in accordance with the control equation $(Ki \times \alpha + \epsilon) \times Gi$.

In addition, the microcomputer 16 determines that the value of the timer T is incremented in such an equation as $T = T + 1$ and the value of the timer T indicates the lapse of the predetermined time i (YES). At this time, the initial flag is reset in the step 306. The microcomputer 16 is changed to the second control constants K and G during the cruise running from the first control constants Ki and Gi immediately after the off operation of the set switch 12a set in the step 303.

Hence, in the first preferred embodiment, the control constants Ki and Gi immediately after the off operation of the set switch 12a have greater values than those second control constants K and G applied during the cruise control until the lapse of the predetermined period of time i upon the change to the off operation of the set switch 12a. After the lapse of the predetermined period of time i, the control constants Ki and Gi are changed to constants K and G applied during the cruising running control. The overshooting or undershooting at the transient state immediately after the off operation the set switch 12a is speedily converged to match the actual vehicle speed with the stored vehicle speed. In addition, such a control is carried out that an excessive response to the change in the vehicle speed during the cruising control can be prevented.

Second Preferred Embodiment

Figure 5:
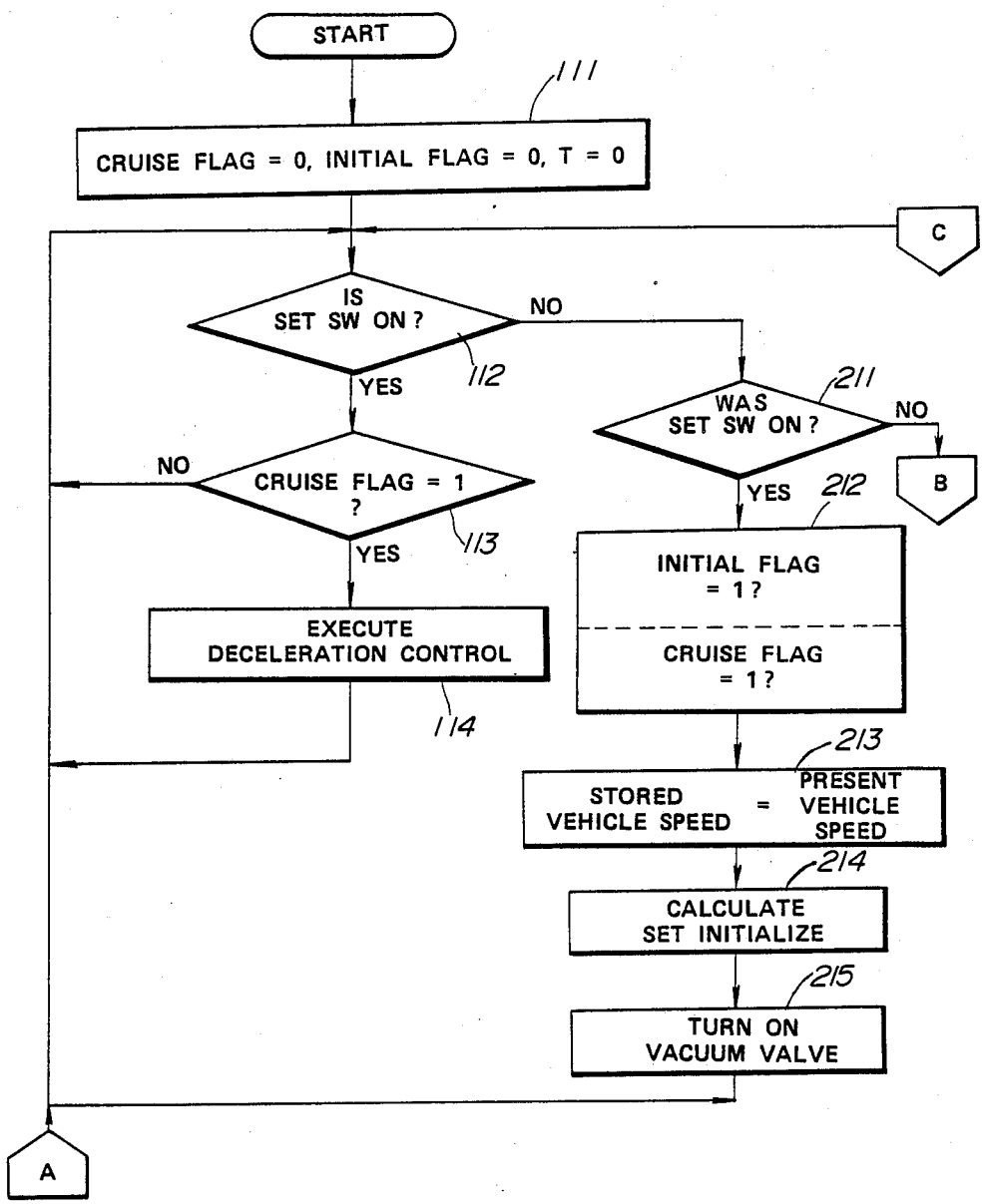
FIGS. 5(A) and 5(B) are integrally a flowchart of a control program routine executed by the microcomputer in a second preferred embodiment.
Figure 5:
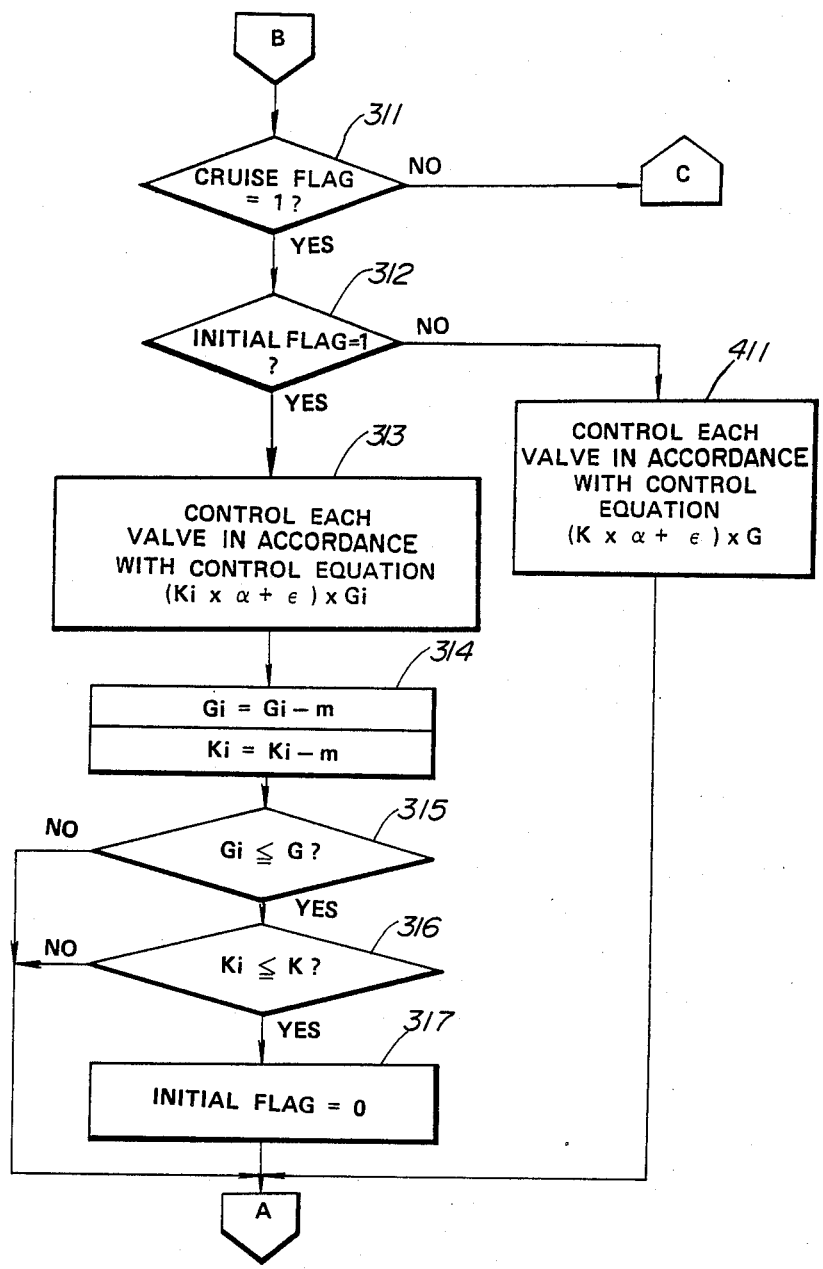

FIGS. 5(A) and 5(B) are integrally a flowchart in a second preferred embodiment according to the present invention.

The setting means in the second preferred embodiment sets the first control constants Ki and Gi having greater values than the second control constants K and G applied during the cruising running control respectively, immediately after the off operation of the set switch 12a. Thereafter, the first control constants Ki and Gi are changed so as to gradually decrease and reach the second control constants K and G during the cruise running control whenever a predetermined time has elapsed.

That is to say, the microcomputer 16 recognizes the number of pulses proportional to the actual vehicle speed derived from the vehicle speed sensor 11.

In this state, the control routine shown in FIGS. 5(A) and (B) is executed by the microcomputer 16.

First, in a step 111, both cruise flag and initial flag are reset to zero.

In a step 112, the microcomputer determines that the set switch 12a has been operated to turn on. When the set switch 12a has been operated to turn on in the step 112 (YES), the routine goes to the Step 113. The microcomputer 16 determines whether the cruise flag is set to 1 in the step 113. When the microcomputer 16 determines that the cruise flag is set to 1 in the step 113 (YES), the routine goes to a step 114. In the step 114, the deceleration control is carried out for the actuator 20. In detail, the vehicle speed is reduced through the engine braking in response to the on operation of the set switch 12a. If the cruise flag is not set to 1 in the step 113 (NO), the routine returns to the step 112.

If the microcomputer determines that the set switch 12a is operated to turn to the off state (NO) in the step 112, the routine goes to a step 211. If, in the step 211, the microcomputer 16 determines that the off State of the Set switch 12a is changed from the on state (YES), the initial flag and Cruise flag are set to is in the Step 212. In the step 213, the vehicle speed at the time of off operation of the set switch 12a (the present vehicle speed) is stored as the stored vehicle speed. Furthermore, the microcomputer 16 calculates the set initialize corresponding to the stored vehicle speed in a Step 214. In a Step 215, the vacuum valve 23 is set to the on state using the set initialize. Then the routine returns to the step 112.

If the microcomputer 16 determines that the off state of the set switch 12a is not changed from the on state (i.e. the set switch 12a is continued to turn on) (NO), the routine goes to a step 311.

In the step 311, the microcomputer 16 determines whether the cruise flag is set to 1. If the microcomputer 16 determines that the cruise flag is not set to 1 (NO), the routine returns to the step 112. If the microcomputer 16 determines that the cruise flag is set to 1 (YES), the routine returns to the step 312. In addition, the microcomputer 16 determines whether the initial flag is set to in the step 112. If the microcomputer 16 determines that the initial flag is set to 1 in the step 312 (YES), the routine goes to a step 313. In the Step 313, each valve 21, 22, and 23 is controlled using the first control constants Ki and Gi (control equation $(Ki \times \alpha + \epsilon).Gi$). In the step 314, the first control constants Ki and Gi are decreased gradually for each sampling period using such equations as $Ki = Ki - m$ and $Gi = Gi - m$. In a step 315, the microcomputer 16 determines whether one of the first control constants, i.e., gain Gi is below the corresponding control constant G applied during the cruise running control. If, in the step 315, the microcomputer 16 determines that one of the first control constants Gi is not below the corresponding control constant G (NO), the routine returns to the step 112. In the Step 316, the microcomputer 16 determines Whether the other first control constant Ki is below the corresponding control constant K during the cruise running control.

If the first control constant Ki in the step 516 is not below the corresponding control constant K (NO), the routine returns to the step 112. If the first control constant Ki in the step 317 is below the corresponding control constant K (YES), the routine goes to the step 317. In the Step 317, the initial flag is reset and the routine returns to the step 112.

If the microcomputer 16 determines that the initial flag is not set to 1 in the step 312 (NO). the routine returns to the step 411. In the step 411, the microcomputer 16 controls each valve 21, 22, and 23 of each actuator 20 using the second control constants K and G (in the control equation $(K \times \alpha + \epsilon) \times G$ applied during the cruise running control. Then the routine returns to the step 112.

When the initial flag is set to 1 in the step 312 in the second preferred embodiment, i.e., when the set switch 12a is operated to turn off, the first control constants Ki and Gi having greater values than the second control constants K and G applied during the cruising running control are set. Each valve 21, 22, and 23 of the actuator 20 is controlled in accordance with the control equation $(Ki \times \alpha + \epsilon) \times Gi$ in which the first control constants Ki and Gi are used.

In a step 314, the microcomputer 16 determines that the first control constants Ki and Gi are decremented by m for each sampling period. When the microcomputer 16 determines that the first control constants Ki and Gi are respectively below the second control constants K and G applied during the cruising control operation (YES) in both steps 315 and 316, the first control constants Ki and Gi in the step 411 are used as the second control constants K and G applied during the cruising running control. The control equation $(K \times \alpha + \epsilon) \times G$ is used to perform the control over each valve 21, 22, and 23 of the actuator 20.

Hence, as shown in FIG. 4, the microcomputer 16 sets the first control constants Ki and Gi having greater values than the second control constants K and G set during the cruising running control, immediately after the off operation of the set switch 12a is carried out. Since the set first control constants Ki and Gi are gradually decreased with respect to time, the overshooting or undershooting of the vehicle speed immediately after the off operation of the set switch 12a are suppressed so that the actual vehicle speed is speedily matched with the stored vehicle speed. As compared with the first preferred embodiment, the overshooting or undershooting state can more smoothly be converged.

Third Preferred Embodiment

Figure 6:
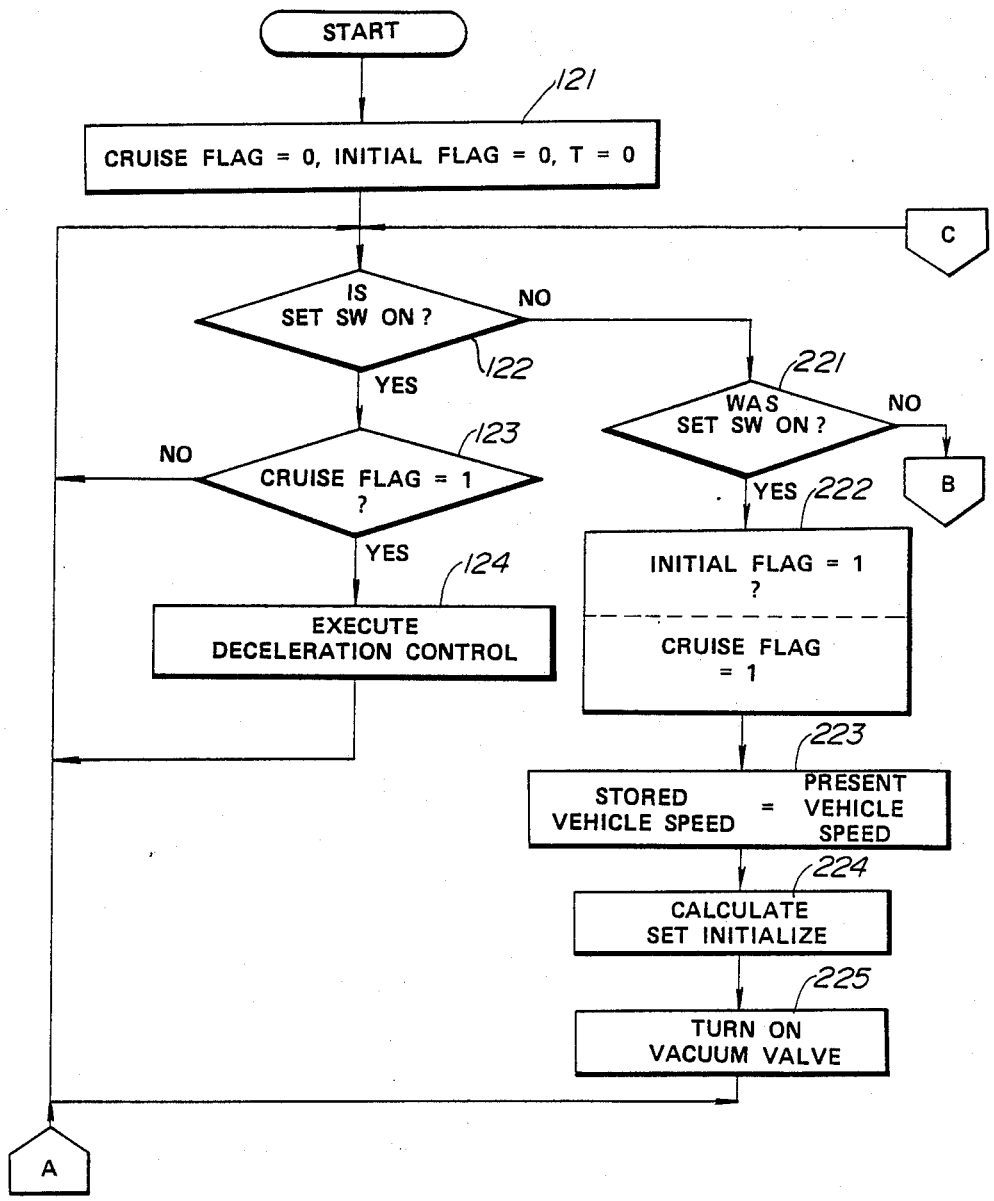
FIGS. 6(A) and 6(B) are integrally a flowchart of a control program routine executed by the microcomputer in a third preferred embodiment.
Figure 6B:
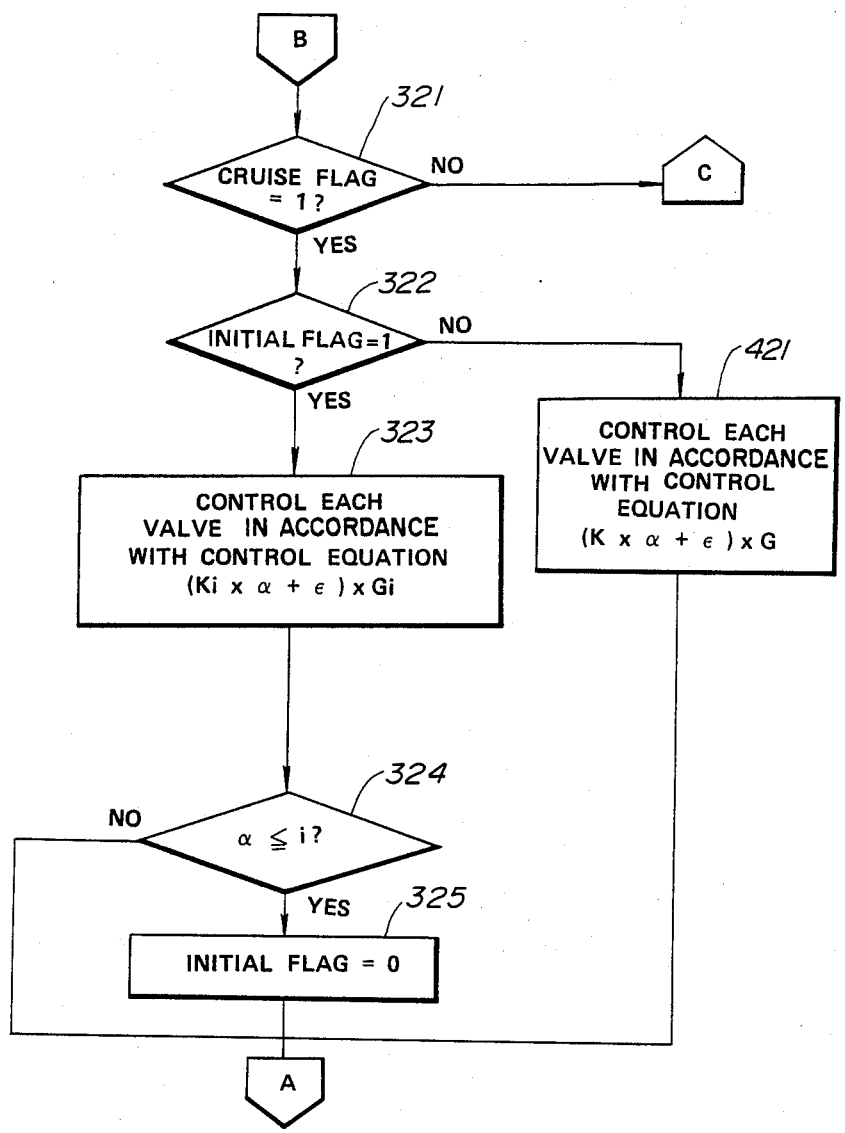

FIGS. 6(A) and 6(B) are integrally a flowchart of a control program routine executed in a third preferred embodiment according to the present invention.

In the third preferred embodiment, the setting means sets the first control constants Ki and Gi which are different from the second control constants K and G, immediately after the off operation of the set switch 12a has been carried out. When an acceleration value α or deceleration value α becomes equal to a set value, the setting of the control constants is changed to the second control constants K and G applied during the cruising running control.

The number of pulses proportional to the actual vehicle speed derived from the vehicle speed sensor 11 are recognized by the microcomputer 16, in the same way as described in the first and second preferred embodiments. The control routine shown in FIGS. 6(A) and 6(B) is also executed in the microcomputer 16. In a step 121, the microcomputer 16 resets the cruise flag and initial flag. In a Step 122, the microcomputer 16 determines whether the set switch 12a has operated to turn on. If the microcomputer 16 determines that the Set switch 12a has operated to turn on in a step 122 (YES), the routine goes tO a Step 123. If the microcomputer 16 determines whether the cruise flag is set to 1 (YES), the routine goes to a step 124. In the step 124, the microcomputer 16 carries out the deceleration control for the actuator 20. The vehicle speed is reduced with the engine braking in response to the on operation of the set switch 12a. If the microcomputer 16 determines that the cruise flag is not set to 1in the step 123 (NO), the routine returns to the Step 122.

If the microcomputer 16 determines that the set switch 12a is Operated to turn off in the step 122 (NO). the routine goes to a step 221. The microcomputer 16 determines in the step 221 whether the off state of the set switch 12a is changed from the on state. If, in the step 221, the microcomputer 16 determines that the off state of the set switch 12a is the changed state from the on state (YES). the routine goes to a step 222 in which the initial flag and cruise flag are set to 1S. In a step 223, the present vehicle speed (i.e., vehicle speed at the time of off operation of the set switch 12a) is stored as the stored vehicle speed. Furthermore, the microcomputer 16 calculates the set initialize corresponding to the stored vehicle speed in a step 224. In a step 225, the microcomputer 16 sets the vacuum valve 23 in the ON state using the set initialize. Then, the routine returns to the step 122.

In addition, if the microcomputer 16 determines that the off state of the set switch 12a is not changed from the on state (NO), the routine goes to a step 321. The microcomputer 16 determines whether the cruise flag is set to 1. If the cruise flag is not set to 1 in the step 321 (NO), the routine returns to the step 122. In addition, if the microcomputer 16 determines that the cruise flag is set to 1in the step 321 (YES), the routine goes to a step 322. The microcomputer 16 determines whether the initial flag is set to in the step 322. If the microcomputer 16 determines that the initial flag is set to 1in the step 322 (YES), the routine goes to a step 323. Each valve 21, 22, and 23 of the actuator 20 is controlled using the control equation (control equation $(Ki \times \alpha + \epsilon) \times Gi$) of the first control constants Ki and Gi immediately after the off operation of the set switch 12a in the step 323. The microcomputer 16 determines whether the acceleration or deceleration becomes below a set value i in a step 324. If the microcomputer 16 determines that the acceleration α or deceleration α is not below the set value i in the step 324 (NO), the routine returns to the step 122. If the microcomputer 16 determines that the acceleration α or deceleration α is below the set value i (YES) in the step 24, the initial flag is reset and then the routine returns to the step 122.

If the microcomputer 16 determines that the initial flag is not set to 1 in the step 322 (NO), the routine goes to a step 421. The control constants Ki and Gi are changed to the control constants K and G set during the cruising running and each valve 21, 22, and 23 is controlled in accordance With the control equation $(K \times \alpha + \epsilon) \times G$ in the step 421. Then, the routine returns to the step 122.

In the third preferred embodiment, when the microcomputer 16 determines that the initial flag is set to 1 in the step 322 (YES), i.e., when the set switch 12a is operated to turn off, the first control constants Ki and Gi having greater values than the second control constants Ki and Gi during the cruise running control operation. Each valve 21, 22, and 23 of the aCtuator 20 is controlled in accordance with the control equation $(Ki \times \alpha + \epsilon) \times Gi$. The first control constants Ki and Gi have greater values than the second control constants K and G in the step 323. In the step 324, the microcomputer 16 determines whether the acceleration α or deceleration α is below the set value i.

In other words, when the vehicle is accelerated or decelerated as shown in FIG. 4, the acceleration α or deceleration α is below the set value i (NO) in the step 324. Each valve 21, 22, and 23 of the actuator 20 is controlled with the first control constants Ki and Gi having greater values than the second control constants K and G during the cruise running control. Therefore, the overshooting or undershooting of the vehicle speed is converged so that the actual vehicle speed is matched with the stored vehicle speed.

When the acceleration or deceleration is below the set value i in the step 324 (YES), i.e., when the actual vehicle speed approaches the stored vehicle speed, the first control constants Ki and Gi set in the step 323 are changed to the second control constants K and G applied during the cruise running control. The control constants are used to control the respective valves 21, 22, and 23 of the actuator 20 so that there is no sensitive response to the change in the vehicle speed during the cruise control.

Since the setting of the control constant is changed according to values of the change rate of the vehicle speed the acceleration α or deceleration α, the exchange of the control constants is carried out regardless of the lapse of time. Therefore, the change in the control constants can be carried out along the change in the road condition.

It is noted that although, in the first, second, and third preferred embodiments, the actuator 20 of a negative pressure controlling type has been described, having the vent valve 21, safety valve 22, and vacuum valve 23, an actuator of a motor driven type which drives the throttle valve axis 29 in response to various commands from the microcomputer 16 or, alternatively, an actuator in a positive pressure controlling type having a pneumatic valve, release valve, and supply valve may be used. It is also noted that the term overshoot includes the overshooting and undershooting of the vehicle speed.

In the automatic vehicle speed controlling system and method according to the present invention, the vehicle speed at the time of the given operation of the set switch is stored in response to the given operation of the set switch. Then; the actual vehicle speed is controlled so as to coincide with the stored vehicle speed using the control constants set immediately after the operation of the set switch which are different from those used during the cruising speed control in which the set signal remains unchanged.

Thus, such environmental conditions (ascending slope or descending slope) as road conditions immediately after the given operation of the set switch or such mechanical conditions as inappropriate adjustment of the control wire are cancelled so that the overshooting or undershooting state can quickly be converged at the transient state. In addition, excessive response to the change in the vehicle speed during the cruising run of the vehicle at the stored vehicle speed can be prevented.

It will clearly be understood by those skilled 0 in the art that the foregoing description is made in terms of the preferred embodiments and various changes and modifications may be made without departing from the scope of the present invention which is to be defined by the appended claims.

What is claimed is:

1. A system for automatically controlling a running speed of a moving object to a desired cruising speed, comprising:
   (a) first means for detecting the running speed of the moving object;
   (b) second means for operatively generating and outputting a command signal to run the moving object at a cruising speed, the cruising speed being a running speed at the time of the output of the command signal by the second means;
   (c) third mans for storing the cruising speed which comprises the running speed detected by the first means in response to the output of the command signal by the second means;
   (d) fourth means responsive to the command signal for suppressing an overshoot of the running speed to a minimum which occurs immediately after the second means generates and outputs the command signal, wherein the fourth means controls the running speed of the moving object with first control constants $K_i$, $G_i$ in a control equation $(K_i \times \alpha + \epsilon) \times G_i$, wherein ($\epsilon$) denotes a difference between the stored cruising speed and the running speed detected by the first means, ($\alpha$) denotes a rate of change in the running speed detected by the first means, and said first control constant $G_i$ denotes a control gain, until a predetermined condition is satisfied; and
   (e) fifth means for controlling the running speed so that the running speed is maintained at the stored cruising speed after the fourth means suppresses the overshoot and the predetermined condition is satisfied, wherein the fifth means controls the running speed of the moving object with second control constants $K$, $G$, which are different from and less than said first control constants $K_i$ and $G_i$, in a control equation $(K_i \times \alpha + \epsilon) \times G$, wherein ($\epsilon$) denotes a difference between the stored cruising speed and the running speed detected by the first means ($\alpha$) denotes a rate of change in the running speed detected by the first means, and said second control constant $G$ denotes a control gain.

2. The system according to claim 1, wherein the predetermined condition is the expiration of a predetermined time period after the second means has generated and outputted the command signal.

3. The system according to claim 1, wherein the first control constants immediately after an off operation of the second means are used in the control equation to control a plurality of valves.

4. The system according to claim 1, wherein the fourth means controls the running speed with the first control constants which are greater than the second control constants immediately after the second means outputs the command signal and thereafter are decremented by the fourth means, and wherein said predetermined condition is that the value of the first control constants is less than or equal to the value of said second control constants.

5. The system according to claim 1, wherein the fourth means controls the running speed with the first control constants until the change rate of the running speed, ($\alpha$), reaches a predetermined value.

6. The system according to claim 1, wherein the fourth means and fifth means comprises: an actuator which drives an angular position of a throttle valve of an engine of the moving object to displace in accordance with the control equations and a control wire connected between the actuator and throttle valve.

7. The system according to the claim 6 wherein the actuator comprises: (a) a casing; (b) a diaphragm, connected to the control wire and defining a chamber with a wall of the casing; (c) a first valve which opens to introduce the atmospheric pressure into the chamber so that the throttle valve displaces toward a close position thereof, and (d) a second valve which opens to introduce a negative pressure from a vacuum source into the chamber so that the throttle valve displaces toward an open position thereof, both first and second valves being controlled to open and close in accordance with the control equation.

8. A method for automatically controlling a vehicle speed to a desired cruising speed, comprising the steps of:
   (a) detecting the vehicle speed:
   (b) generating and outputting a command signal to run the vehicle speed at a speed when an operation of a set switch is carried out;
   (c) storing the vehicle speed at which the vehicle cruises in response to the command signal outputted in the step (b);
   (d) suppressing an overshoot of the vehicle speed to a minimum, the overshoot occurring immediately after the vehicle speed is controlled to arrive at the stored vehicle speed in step (c) in accordance with a first predetermined control equation $(K_i \times \alpha + \epsilon) \times G_i$ having first control constants $K_i$, $G_i$, wherein ($\alpha$) denotes a difference between the stored cruising speed and the detected vehicle speed, ($\epsilon$) denotes a rate of change in the detected vehicle speed and said first control constant $G_i$ denotes a control gain, in response to the command signal outputted in the step (b); and
   (e) controlling the vehicle speed detected in the step (a) in accordance with a second predetermined control equation $(K_i \times \alpha + \epsilon) \times G$ having second control constants $K$, $G$, which are different from and less than said first control constants $K_i$ and $G_i$, wherein ($\alpha$) denotes a difference between the stored cruising speed and the detected vehicle speed, ($\alpha$) denotes a rate of change in the detected vehicle speed and said second control constant $G$ denotes a control gain so that the vehicle speed coincides with the stored vehicle speed after the suppression of the overshoot in step (d);

wherein steps (d) and (e) include controlling first and second valves operative with atmospheric and negative pressures to displace a throttle valve to open and closed positions in accordance with the first and second control equations.

9. The method according to claim 8 wherein the operation of the set switch in step (b) is such that the set switch is turned off after the set switch is once turned on.

10. A system for a vehicle, comprising:
   (a) first means for detecting a current vehicle speed;
   (b) second means for operatively generating and outputting a cruise control command signal to set the current vehicle speed as a desired cruise speed;
   (c) third means responsive to the cruise control command signal for generating and outputting a first control command signal based on a first control equation $(Ki \times \alpha + \epsilon) \times Gi$ that uses first control constants $Ki$, $Gi$, wherein ($\alpha$) denotes a difference between the stored cruising speed and the detected vehicle speed, ($\epsilon$) denotes a rate of change in the detected vehicle speed and said first control constant $Gi$ denotes a control gain, immediately after receiving the cruise control command signal and a predetermined interval of time has passed, thereafter outputting a second control command signal based on a second control equation $(Ki \times \alpha + \epsilon) \times G$ that uses second control constants $K$, $G$, wherein ($\alpha$) denotes a difference between the stored cruising speed and the detected vehicle speed, ($\epsilon$) denotes a rate of change in the detected vehicle speed and said second control constant $G$ denotes a control gain, the first control constants being different from and larger than the second control constants; and
   (d) fourth means for adjusting an operating variable of an engine driving force adjusting mechanism of the vehicle in accordance with the first and second control command signals based on said first and second control equations so that an overshoot of the desired cruise speed during the transfer from a normal running operation to a cruise speed control operation is prevented and the vehicle speed is maintained at the cruise speed.

11. A system as set forth in claim 10, wherein the first control constants are different from the second control constants during a predetermined period of time, from a time immediately after the second means outputs the cruise control command signal.

12. A system as set forth in claim 10, wherein the first control constants are larger than the second control constants immediately after the second means outputs the cruise control command signal and thereafter the first control constants are decreased gradually toward the second control constants.

13. A system as set forth in claim 10, wherein the first control constants are different from the second control constants until a change rate of the current vehicle speed reaches a set value.

14. A system as set forth in claim 10, wherein the operating variable of the engine driving force adjusting mechanism is an opening angle of an engine throttle valve, the second means includes a set switch which outputs the cruise control command signal when the set switch is turned on and thereafter turned off and the fourth means includes a normally open safety valve responsive to the first and second control command signals from the third means for closing a chamber defined by a diaphragm linked to the throttle valve, a normally open ventilation valve responsive to the first and second control command signals from the third means for closing the chamber, and a normally closed vacuum pressure supply valve responsive to the first and second control command signals from the third means for opening the chamber so that the opening angle of the throttle valve is increased.

* * * * *